3,139,765
POWER-ASSISTED STEERING GEAR FOR
VEHICLES
Frederick H. Heacock, 128 Dower Road,
Sutton Coldfield, England
Filed July 14, 1961, Ser. No. 125,037
Claims priority, application Great Britain July 25, 1960
11 Claims. (Cl. 74—388)

This invention relates to power-assisted steering gear for vehicles of the kind which embodies a fluid-pressure actuated cylinder unit together with a steering shaft and a pitman arm shaft, the latter being angularly movable on rotation of the steering shaft, and said cylinder unit being arranged to effect or assist such angular movement of the pitman arm shaft. The object of the invention is to provide a new or improved arrangement.

In accordance with the invention, a power-assisted steering gear for vehicles of the kind specified comprises a steering box housing, a fluid pressure actuated cylinder unit pivotally mounted in the housing and operatively connected to the pitman arm shaft which extends across the housing, and a control valve for controlling the supply of fluid to the cylinder unit, said control valve being mounted on or connected to the housing so as to be spaced apart from the cylinder unit.

In a preferred form, the control valve and cylinder unit are disposed on opposite sides of the steering shaft which extends into the housing.

Conveniently, the cylinder unit is connected to the pitman arm shaft by a lever integral with the pitman arm shaft, said lever being pivotally connected at one end to the lower end of the piston rod of said cylinder unit and the lower end of the steering shaft may be pivotally connected to a valve actuating arm which is itself pivotally connected at one end to said lever and which is connected at the other end to the control valve. Alternatively, the valve actuating arm may be pivotally connected to said lever at a position intermediate the ends of said arm. The connection between the valve actuating arm and the associated valve is preferably by means of a pivoted link arranged so that the pivot between said link and said arm lies on the axis of the pitman arm shaft when the valve is in its neutral position.

Figure 1:
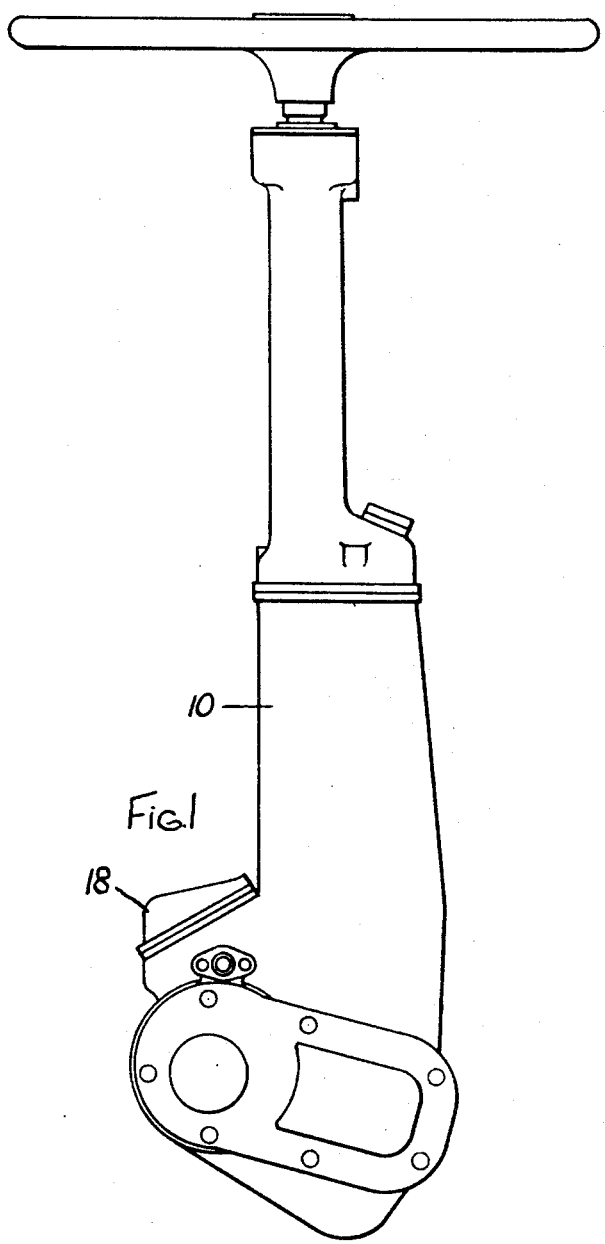
Figure 2:
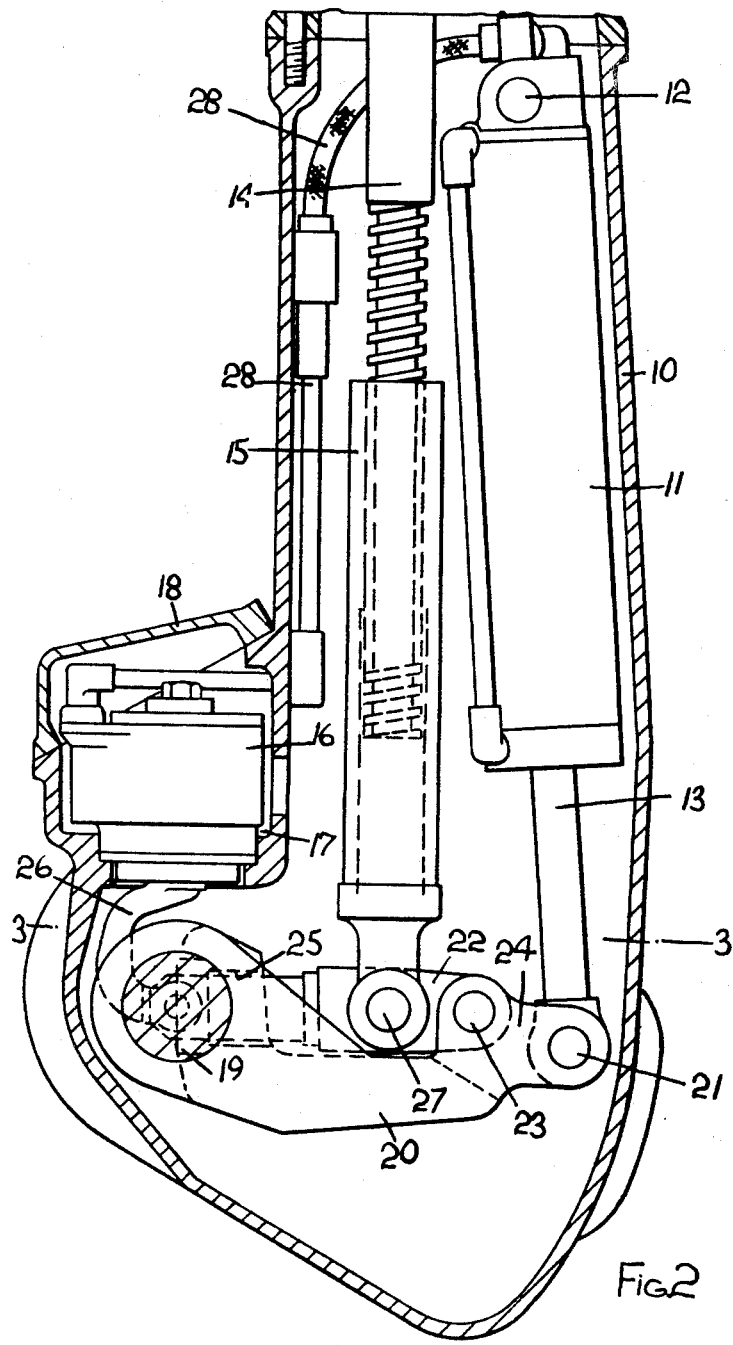
Figure 3:
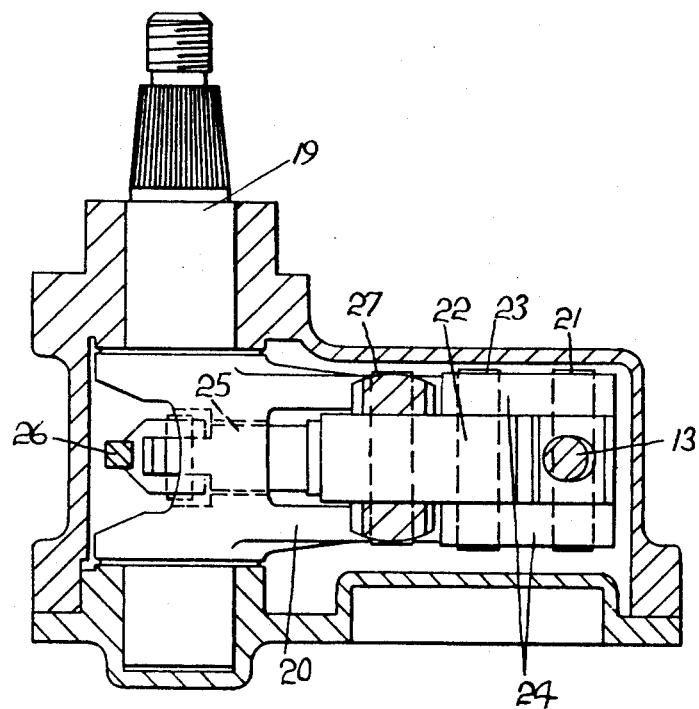

The invention will now be more particularly described with reference to the accompanying drawings wherein:

FIGURE 1 is an elevation showing one form of power-assisted steering gear in accordance with the invention, FIGURE 2 is a sectional elevation, on a larger scale, of the steering gear shown in FIGURE 1, and FIGURE 3 is a sectional view on the line 3—3 of FIGURE 2.

Referring to the example shown in the drawings there is provided a power-assisted steering gear having a housing 10 in which is mounted a fluid pressure actuated cylinder unit 11. Conveniently, said cylinder unit is adapted to be actuated by hydraulic fluid and the housing 10 forms a reservoir for such fluid. The cylinder unit is double-acting and is pivotally connected to the housing at its upper end 12, the piston rod 13 of the unit extending through its lower end.

The lower end of the steering shaft 14 extends into the housing and is formed with a screw thread which engages a threaded sleeve or nut 15 whereby rotation of the steering shaft will result in axial movement of said sleeve. Furthermore, the cylinder unit 11 and lower end of the steering shaft 14 are arranged in the housing so that the cylinder unit is disposed on the in situ forward side of the steering shaft.

There is also provided a control valve 16 for the cylinder unit and said control valve is disposed on the in situ rearward side of the steering shaft 14 so that the cylinder unit 11 and control valve 16 lie on opposite sides of said steering shaft. Said control valve may be mounted on the exterior of the housing or within the housing or in an extension thereof and the valve may be enclosed in a fluid-tight manner. Thus, as shown in the drawings, the valve 16 is enclosed in a chamber 17 to which access may be obtained after removal of a cover 18.

The steering gear is also provided with a pitman arm shaft 19 which extends transversely across the housing so that it is disposed rearward of the steering shaft 14 and said pitman arm shaft carries the pitman arm which is connected to the vehicle steering gear in a known manner (not shown). The lower end of the piston rod 13 of the cylinder unit is pivotally connected to one end of a lever 20 which is integral with or secured at its other end to said pitman arm shaft 19 so that axial movement of said piston rod will effect rotation of the pitman arm shaft. The aforementioned lever 20 may be in the form of a forging which is of generally forked configuration. The two arms of the fork are adapted at one end (namely that end remote from the pitman arm shaft) to receive between them the adjacent end of the piston rod 13 of the cylinder unit which is connected to the fork by a pin 21 which permits relative pivotal movement between the piston rod and the lever.

The aforementioned lever 20 is also pivotally connected to a valve actuating arm 22 by means of a pivot pin 23 which is located at each end in a lug 24 formed on the lever 20, the pivotal connection between said lever and the valve actuating arm 22 being disposed between the pitman arm shaft 19 and the opposite end of the lever. Said valve actuating arm 22 extends at its other end through an aperture 25 formed in the lever 20 adjacent to the pitman arm shaft and is pivotally connected at this end to one end of a shaped link 26 which at its other end is connected to the aforementioned control valve 16. The valve actuating arm 22 is also pivotally connected intermediate its ends to the lower end of the threaded sleeve 15 which engages with the thread or worm formed on the lower end of the steering shaft 14. Conveniently, said sleeve 15 is connected to the valve actuating arm 22 through the intermediary of a pivot pin 27. There is also provided a clearance between the arm 22 and the aperture 25 so as to permit of the valve actuating arm having a limited degree of pivotal movement relative to said lever 20. Alternatively the arm 22 may be provided with an elongated slot with which is engaged a pin secured to the lever 20, the pin-and-slot connection thus provided again limiting pivotal movement of arm 22 relative to lever 20. Thus in the normal course of events manual rotation of the steering shaft 14 will result in axial movement of the sleeve 15 thereby causing a limited degree of pivotal movement of the valve actuating arm 22 relative to the lever 20. This in turn will operate the control valve 16 which will supply pressurised fluid to one end or the other of the cylinder unit 11 thereby pivoting the lever 20 in a direction which tends to cancel the aforementioned pivotal movement of arm 22 relative to lever 20 and turning the pitman arm shaft to which the lever is connected. The control valve is conveniently connected to the cylinder unit by means of a pair of flexible pipes 28 which serve to lead fluid to either end of said cylinder unit and there would be provided an external pump (not shown) which is arranged to draw fluid from the reservoir formed by the housing and supply fluid to the control valve. The arrangement may be such that the pumped fluid will flow freely through the control valve when the latter is in its neutral or inoperative position whereas movement of the control valve from said neutral position will create a restriction causing pressurised fluid to flow to one end or the other of the cylinder unit. Furthermore, in the neutral position of the valve, the pivotal axis of the connection between said link 26 and the valve actuating arm lies on the axis of the pitman arm shaft 19. Alternatively, the control valve and cylinder unit may be supplied with fluid from an hydraulic accumulator. If, however, the cylinder unit or control valve should become defective manual operation of the steering gear will still be possible as axial movement of the sleeve 15 which engages the steering shaft will result in pivotal movement of the lever 20 (and thus the pitman arm shaft) once the aforesaid clearance between the lever and the valve actuating arm has been taken up.

With a steering gear as above described it will be appreciated that the construction is relatively simple as the cylinder unit 11 is separate from the control valve 16. This provides the possibility of manufacturing a basic or standard form of steering gear which can easily be converted to provide different maximum outputs for any given maximum hydraulic pressure by using cylinder units of different bore size, whilst retaining a standard control valve. Furthermore, the control valve (being separate from the cylinder unit) will be easily accessible for purposes of maintenance or removal and can be arranged to permit a convenient connection to a supplementary power cylinder acting on the steering linkage for such vehicles where a very high axle weight or extreme service conditions may be considered to be too severe for a conventional single drag link steering arrangement.

In an alternative construction the valve actuating arm 22 may be connected to the lower end of the steering shaft at one end of said arm and may be pivotally connected intermediate its ends to the lever 20.

Having thus described my invention, what I claim as new and desire to secure by Letters Patent is:

1. A power assisted steering gear for vehicles comprising a steering box housing, a rotatable steering column extending into said housing, said steering column being provided with a threaded portion, a rock shaft mounted in said housing and extending therefrom to operate a steering arm, a first lever fixedly mounted on said rock shaft, said first lever lying generally in a plane including said steering column, a double-acting hydraulic cylinder and piston means mounted in said housing and lying generally parallel to said steering column, means connecting said hydraulic cylinder and piston means to said first lever whereby said first lever will be biased by said hydraulic cylinder and piston means, a link, a control valve in said housing operable by lineal movement of said link, nut means mounted on said steering column cooperating with said threaded portion so as to be moved longitudinally of said steering column upon rotation of said column, a second lever connecting said nut means to said first lever, one end of said second lever being pivoted to said first lever, and the other end of said second lever being connected to said control valve by means of said link, a hydraulic circuit including a source of hydraulic fluid under pressure, said control valve being positioned in said hydraulic circuit to direct flow of hydraulic fluid under pressure to said cylinder and piston means to bias said first lever in the same direction as it is biased by said second lever.

2. A power assisted steering gear as claimed in claim 1, wherein said first lever is formed with an aperture and said second lever passes in laterally spaced relation through said aperture, whereby direct mechanical contact between the levers is effected to the rock shaft in the event of a failure of power assistance.

3. A power assisted steering gear including a source of hydraulic fluid, a rotatable steering column having screw threads thereon, a nut element on said screw threads adapted to be moved axially of said steering column by rotation of said steering column, a pitman shaft, a first lever fixed to said pitman shaft, a double-acting cylinder and piston means connected to said first lever adapted, under the influence of hydraulic fluid from said source of hydraulic fluid, to bias said first lever in one or the other direction, a link, a control valve operable by movement of said link in one or the other direction to determine the direction in which said cylinder and piston means biases said first lever, a differential means connected to said first lever, to said link and to said nut element, said differential means being connected so as to move said link to operate said control valve in a direction to cause said cylinder and piston means to bias said first lever in the same direction as said differential means biases said first link.

4. The power assisted steering gear of claim 3, in which said differential means comprises a second lever, one end of said lever being connected to said first lever, the other end being connected to said link, and said nut element being operatively connected to a point between the two ends of said second lever.

5. A power assisted steering gear including a source of hydraulic fluid, a housing, a rocker arm shaft extending into said housing, a lever secured to said rocker arm shaft within said housing, cylinder and piston means within said housing, one end of said cylinder and piston means being pivotally secured to said housing, the other end of said cylinder and piston means being secured to said lever, whereby said lever may be biased to selectively rock said rocker arm shaft, a push-pull valve means to selectively direct hydraulic fluid to one or the other end of said cylinder and piston means, a rotatable steering shaft extending into said housing generally parallel to said cylinder and piston means, a sleeve member mounted on said steering shaft, means on said steering shaft and said sleeve whereby said sleeve is moved axially along in a direction dependent on the direction of rotation of said steering shaft, a control arm pivotally connected to said push-pull valve means and to said lever, and means operatively connecting said sleeve to said control arm, whereby said lever is biased in a selected direction by movement of said sleeve axially of said steering shaft both by the pivotal connection of said control arm to said lever and by operation of said push-pull valve means.

6. Power-assisted steering gear for vehicles comprising a steering box housing, a pivot in said housing, a fluid pressure actuated cylinder unit mounted on the pivot so as to be pivotable within and relative to the housing, a rotatable steering shaft, a control valve attached to the housing separate from said cylinder unit, control means operable by rotation of the steering shaft to actuate said control valve to control the supply of operating fluid to said cylinder unit, a pitman arm shaft extending into the housing, and a mechanical linkage between said cylinder unit and the pitman arm shaft whereby actuation of said unit causes exertion of a force between said pivot and the pitman arm shaft to rotate the latter, said control means also being connected to said mechanical linkage whereby rotation of the steering shaft causes a direct force to be applied to said pitman arm shaft.

7. A power assisted steering gear for vehicles comprising a steering box housing, a rotatable steering column extending into said housing, said steering column being provided with a threaded portion, a rock shaft mounted in said housing and extending therefrom to operate a steering arm, a first lever fixedly mounted on said rock shaft, said first lever lying generally in a plane including said steering column, a double-acting hydraulic cylinder and piston means mounted in said housing and lying generally parallel to said steering column, means connecting said hydraulic cylinder and piston means to said first lever whereby said first lever will be biased by said hydraulic cylinder and piston means, a link, a control valve in said housing operable by lineal movement of said link, nut means mounted on said steering column cooperating with said threaded portion so as to be moved longitudinally of said steering column upon rotation of said column, a second lever connecting said nut means to said first lever, one end of said second lever being pivoted to said first lever, a pivot connecting the other end of said second lever to said link and substantially coaxial with said rock shaft, a hydraulic circuit including a source of hydraulic fluid under pressure, said control valve being positioned in said hydraulic circuit to direct flow of hydraulic fluid under pressure to said cylinder and piston means to bias said first lever in the same direction as it is biased by said second lever.

8. A power assisted steering gear for vehicles including a steering box housing, a rotatable steering column extending into the housing, a source of hydraulic fluid, a hydraulic piston and cylinder unit pivotably mounted in the housing, a control valve mounted in the housing apart from said unit for selectively directing hydraulic fluid from said source to one or the other end of said unit, a pitman arm shaft extending into the housing, a first lever having an end fast with said shaft and another end pivotally connected to said piston and cylinder unit for rocking thereby, a second lever pivoted on said first lever, an operating link for the control valve, a pivot interconnecting said link and said second lever and substantially coaxial with said pitman arm shaft, said first lever being formed with an aperture which embraces in laterally spaced relation said second lever, a rotatable steering shaft extending into said housing, and screw and nut means positively interconnecting said steering shaft and said second lever for pivoting said second lever on said first lever in response to rotation of said steering shaft and for biasing said first lever to rock the same, such pivoting actuating said control valve to direct fluid to said piston and cylinder unit in a direction to reinforce said biasing.

9. A power assisted steering gear as claimed in claim 8, wherein said screw and nut means consists of an internally screw-threaded sleeve pivoted on said second lever, and a corresponding external screw thread on said steering shafts, said sleeve embracing said external screw thread.

10. A power assisted steering gear for vehicles including a steering box housing, a fluid pressure actuated piston and cylinder unit pivotally mounted in the housing, a pitman arm shaft extending into the housing, a steering column extending into the housing, a lever fast with the pitman arm shaft, means coupling the lever to the piston and cylinder unit for urging the lever in either direction and for rotating he pitman arm shaft in either direction, a control valve on the casing for controlling the supply of pressure fluid to the piston and cylinder unit, an actuating link for the valve, means for deriving linear motion from rotation of said steering column, and a floating valve-actuating member pivotally coupled at one end to the link and at the other to the lever and at an intermediate point to said means for deriving linear motion from rotation of the steering column, the arrangement being such that movement of the means for urging the lever in either direction causes the control valve to actuate said unit for urging the lever in the same direction.

11. A power assisted steering gear for vehicles including a steering box housing, a fluid pressure actuated piston and cylinder unit pivotally mounted in the housing, a pitman arm shaft extending into the housing, a steering column extending into the housing, a lever fast with said shaft, means coupling the lever to the piston and cylinder unit for urging the lever in either direction and for rotating said shaft, a control valve on said casing for controlling the supply of pressure fluid to said unit, an actuating link for the valve, means for deriving linear motion from rotation of said steering column, and a floating valve-actuating member pivotally coupled to said link and to said lever and to said means for deriving linear motion, the pivotal connection between said member and said link being substantially coaxial with said shaft when said valve is in its neutral position, and the arrangement being such that movement of said means for urging said lever in either direction causes said valve to actuate said unit for urging said lever in the same direction.

References Cited in the file of this patent
UNITED STATES PATENTS 2,682,778    Creson et al.             July 6, 1954
2,828,829    Lincoln et al.           Apr. 1, 1958